(12) United States Patent
Eguchi (10) Patent No.: US 10,754,407 B2
(45) Date of Patent: Aug. 25, 2020

(54) IMAGE FORMING APPARATUS AND PROGRAM

(71) Applicant: KONICA MINOLTA, INC., Chiyoda-ku, Tokyo (JP)

(72) Inventor: Munetoshi Eguchi, Tachikawa (JP)

(73) Assignee: KONICA MINOLTA, INC., Tokyo (JP)

(*) Notice: Subject to any disclaimer, the term of this patent is extended or adjusted under 35 U.S.C. 154(b) by 96 days.

(21) Appl. No.: 16/192,644

(22) Filed: Nov. 15, 2018

(65) Prior Publication Data

US 2019/0155356 A1 May 23, 2019

(30) Foreign Application Priority Data

Nov. 22, 2017 (JP) ................................ 2017-224277

(51) Int. Cl.
| | |
|---|---|
| *G06F 1/32* | (2019.01) |
| *G06F 1/3203* | (2019.01) |
| *G06F 3/12* | (2006.01) |
| *H04N 1/21* | (2006.01) |
| *H04N 1/00* | (2006.01) |
| *H04N 1/32* | (2006.01) |

(52) U.S. Cl.
CPC .......... *G06F 1/3203* (2013.01); *G06F 3/1211* (2013.01); *G06F 3/1229* (2013.01); *H04N 1/00904* (2013.01); *H04N 1/21* (2013.01); *H04N 1/32475* (2013.01)

(58) Field of Classification Search
CPC ..... G06F 1/3287; G06F 3/1229; G06F 9/4893
See application file for complete search history.

(56) References Cited

U.S. PATENT DOCUMENTS

| | | | |
|---|---|---|---|
| 2015/0331643 A1* | 11/2015 | Nishikawa | .............. G06F 3/124 |
| 2017/0060644 A1 | 3/2017 | Tanaka | |
| 2019/0138863 A1* | 5/2019 | Sato | ................... G06K 15/1822 |

FOREIGN PATENT DOCUMENTS

| | | |
|---|---|---|
| JP | 2008097280 A | 4/2008 |
| JP | 2012111210 A | 6/2012 |
| JP | 2017046084 A | 3/2017 |

\* cited by examiner

*Primary Examiner* — Albert Wang
(74) *Attorney, Agent, or Firm* — Holtz, Holtz & Volek PC (57) ABSTRACT

An image forming apparatus includes a hardware processor including CPUs each including cores, a process being executed by the CPUs, wherein the hardware processor managing the cores causes a first process or a second process to be executed, when the first process is executed, while electric power is uniformly supplied to the cores, allocates a pre-process in which sequential processing is performed to a part of the cores and a post-process in which parallel processing is performed to another part of cores, and when the second process is executed, for a part of the CPUs, allocates the pre-process to a part of the cores while electric power is supplied thereto and causes electric power supply to another part of cores to be stopped, and for another part of the CPUs, allocates the post-process to at least a part of the cores while electric power is uniformly supplied to the cores.

11 Claims, 12 Drawing Sheets

| PROCESS CLASSIFICATION | DOCUMENT (1) | DOCUMENT (2) |
|---|---|---|
| PRE-PROCESS (LANGUAGE ANALYSIS) | LIGHT | HEAVY |
| POST-PROCESS (RASTERIZATION) | HEAVY | LIGHT |

IMAGE FORMING APPARATUS AND PROGRAM

The entire disclosure of Japanese patent Application No. 2017-224277, filed on Nov. 22, 2017, is incorporated herein by reference in its entirety.

BACKGROUND

Technological Field

The present disclosure relates to an image forming apparatus and a program.

Description of the Related Art

Recently, a plurality of cores is adopted as a central processing unit (CPU) mounted in an image forming apparatus such as a multi-function peripheral (MFP), instead of one whose number of cores is one, and processes are executed using the plurality of cores. For example, as disclosed in JP 2008-097280 A, there has been proposed a technology that activates all the cores at an upper limit action frequency such that the upper limit action frequency of a low priority core is reduced when an abnormal temperature is detected. In addition, for example, as disclosed in JP 2017-046084 A, there has been proposed a technology that allots software processes to cores according to the load of each job action such that supply of power to an unnecessary core is stopped. Furthermore, for example, as disclosed in JP 2012-111210 A, there has been proposed a technology that shortens a raster image processor (RIP) process by performing division on a band basis and parallelizing a rendering process while advancing language analysis.

However, in the prior art as described in JP 2008-097280 A, control is exercised for the purpose of power saving and therefore control for raising the upper limit action frequency is not executed. In addition, in the prior art as described in JP 2017-046084 A, power supply of an unnecessary core is merely turned off. Furthermore, in the prior art as described in JP 2012-111210 A, in a case where, for example, a document requires time for language analysis, the rendering process cannot be started and therefore there is a fear that the time required to complete the process cannot be shortened as a whole.

SUMMARY

The present disclosure has been made in view of such situations and it is intended to achieve a shortened overall processing time.

To achieve the above mentioned object, according to an aspect of the present invention, an image forming apparatus reflecting one aspect of the present invention comprises a hardware processor including a plurality of central processing units (CPUs) each including a plurality of cores, a process being executed by the CPUs, wherein the hardware processor that manages the plurality of cores causes either one of a first process or a second process to be executed, when causing the first process to be executed, while causing electric power to be uniformly supplied to the plurality of cores included in each of the CPUs, allocates a pre-process in which sequential processing is performed to a part of cores among the plurality of cores and allocates a post-process in which parallel processing is performed to another part of cores, and when causing the second process to be executed, among the plurality of CPUs, for a part of the CPUs, allocates the pre-process to a part of cores among the plurality of cores while causing electric power to be supplied to the part of cores and causes supply of electric power to another part of cores to be stopped, and for another part of the CPUs, allocates the post-process to at least a part of the plurality of cores while causing electric power to be uniformly supplied to the plurality of cores.

BRIEF DESCRIPTION OF THE DRAWINGS

The advantages and features provided by one or more embodiments of the invention will become more fully understood from the detailed description given hereinbelow and the appended drawings which are given by way of illustration only, and thus are not intended as a definition of the limits of the present invention.

DETAILED DESCRIPTION OF EMBODIMENTS

Hereinafter, one or more embodiments of the present invention will be described with reference to the drawings. However, the scope of the invention is not limited to the disclosed embodiments.

Figure 1:
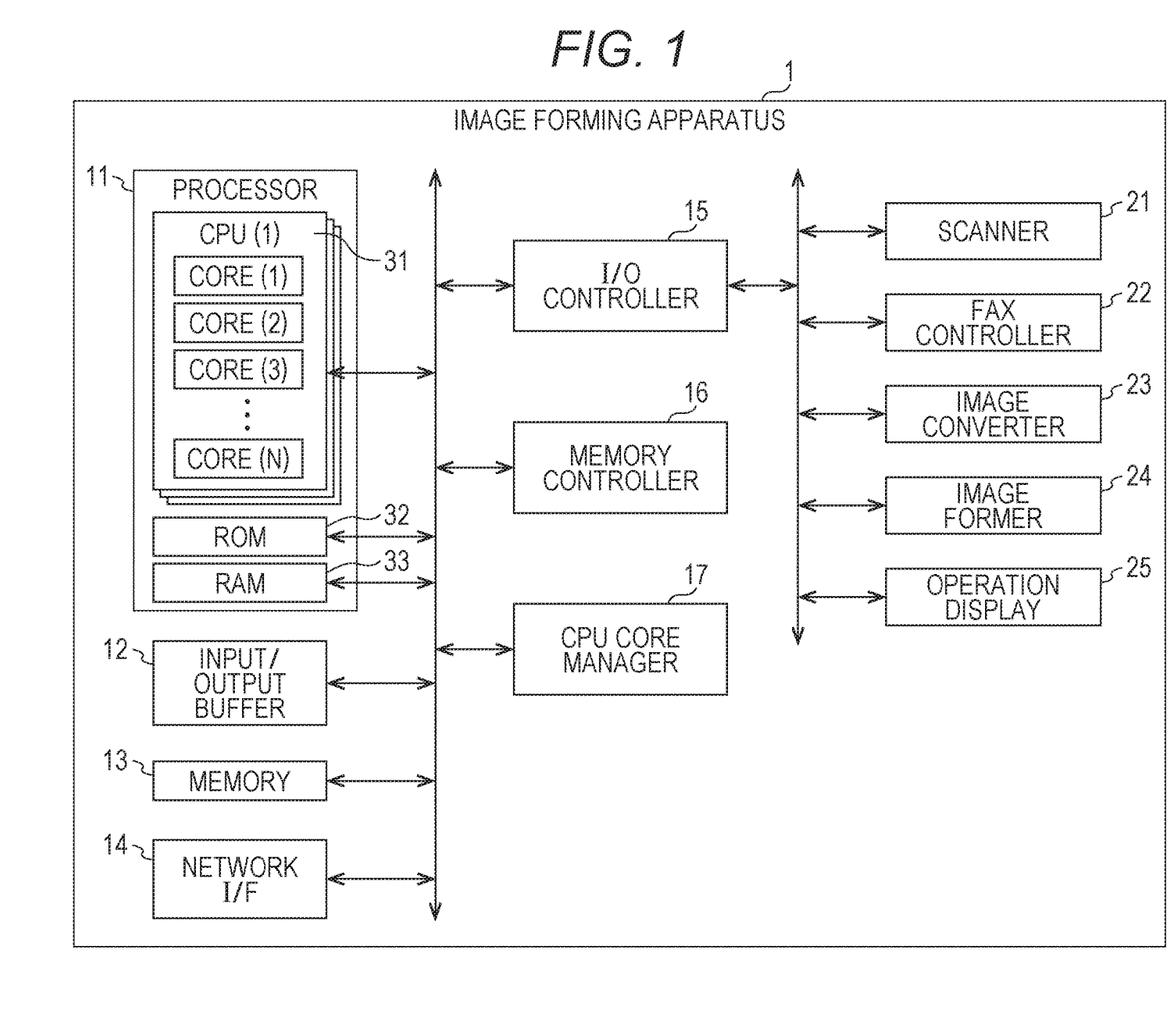
FIG. 1 is a block diagram illustrating a configuration example of an image forming apparatus according to an embodiment of the present disclosure.

FIG. 1 is a block diagram illustrating a configuration example of an image forming apparatus 1 according to an embodiment of the present disclosure. The image forming apparatus 1 is a combined machine such as an MFP or a printer and, as illustrated in FIG. 1, includes a CPU 31, a read only memory (ROM) 32, a random access memory (RAM) 33, an input/output buffer 12, a memory 13, a network interface (I/F) 14, an input/output (I/O) controller 15, a memory controller 16, a CPU core manager 17, a scanner 21, a facsimile (FAX) controller 22, an image converter 23, an image former 24, and an operation display 25. The CPU 31, the ROM 32, and the RAM 33 constitute a processor 11. The CPU 31 is a data processing device that performs computation in accordance with a program and includes a plurality of cores. The ROM 32 records a program for controlling the overall action of the image forming apparatus 1, font data, and the like. The RAM 33 stores data necessary for control by the CPU 31 and data that needs to be temporarily stored at the time of control action. Note that the plurality of cores may be the same type of cores having the same scale, configuration, and processing capability, or may be different types of cores having different scales, configurations, and processing capabilities. As described above, the image forming apparatus 1 is provided with the processor 11 including a plurality of the CPUs 31 each including the plurality of cores and processes are executed by the CPUs 31.

The input/output buffer 12 is for temporarily storing data that has been input or data to be output and, for example, stores image data output from the scanner 21 or FAX image data transmitted and received using the FAX controller 22, and the like. The memory 13 is constituted by a semiconductor memory or a hard disk drive and saves therein print data acquired from an external computer device (not illustrated) (page description language (PDL) data described in a page description language such as printer job language (PJL), PostScript (PS), or printer control language (PCL)), portable document format (PDF) data, intermediate data (display list) generated from print data, image data generated from a display list, and the like. The network I/F 14 is a modem for connecting to a telephone line, a network interface card (NIC) for connecting to a local area communication network such as a local area network (LAN), and the like and enables FAX communication with a FAX device connected via a telephone line or communication with a computer device connected via a local area communication network.

The scanner 21 is a component that optically reads image data from a document placed on a document platen. The scanner 21 is constituted by a light source that scans the document, an image sensor such as a charge coupled device (CCD) that converts light reflected from the document into an electrical signal, an analog-to-digital (A/D) converter that A/D-converts the electrical signal, and the like and outputs image data read from the document to the input/output buffer 12 or the image converter 23. The FAX controller 22 controls the network I/F 14 to execute a number display response, a normal reception process, transmission and reception of FAX image data, and the like and outputs the received FAX image data to the input/output buffer 12, the image converter 23, or the image former 24. The image converter 23 performs an image process such as an edge emphasis process, a smoothing process, or a color conversion process on the image data of the document read by the scanner 21 or the FAX image data received by the FAX controller 22. In addition, when print data described in the PDL is acquired by the network I/F 14 or the like, the image converter 23 rasterizes each page included in the print data to generate image data of every page and performs the image process as described above on the generated image data. The image converter 23 outputs the image data after the image process to the image former 24. The image former 24 performs a printing process on a sheet based on the image data on which the image process has been performed by the image converter 23. Specifically, in the case of an electrophotographic technique, an electrostatic latent image is formed by irradiating a photosensitive drum charged by a charging device with light according to image data from an exposure device; a toner image generated by development after attaching toner charged by a developing device is primarily transferred to a transfer belt, secondarily transferred from the transfer belt to a sheet, and additionally the toner image on the sheet is fixed by a fixing device.

The operation display 25 is constituted by a touch panel in which an operation member such as a touch sensor made up of lattice-shaped transparent electrodes is arranged on a display member such as a liquid crystal display (LCD), a hard key, and the like. The operation display 25 presents an operation screen for the image forming apparatus 1, accepts an operation from a user, and outputs a signal according to the operation to the processor 11. The I/O controller 15 controls transmission and reception of various types of signals between the processor 11 and the scanner 21, the FAX controller 22, the image converter 23, the image former 24, and the operation display 25. The memory controller 16 controls transmission and reception of various types of signals between the processor 11 and the memory 13. The CPU core manager 17 manages the plurality of cores and decides the allocation to cores according to a process to be executed. The CPU core manager 17 may be configured as hardware or may be configured as a program that causes the processor 11 to function as the CPU core manager 17 such that this program is executed by at least a part of cores included in at least a part of the CPUs 31 among the plurality of CPUs 31.

Figure 2:
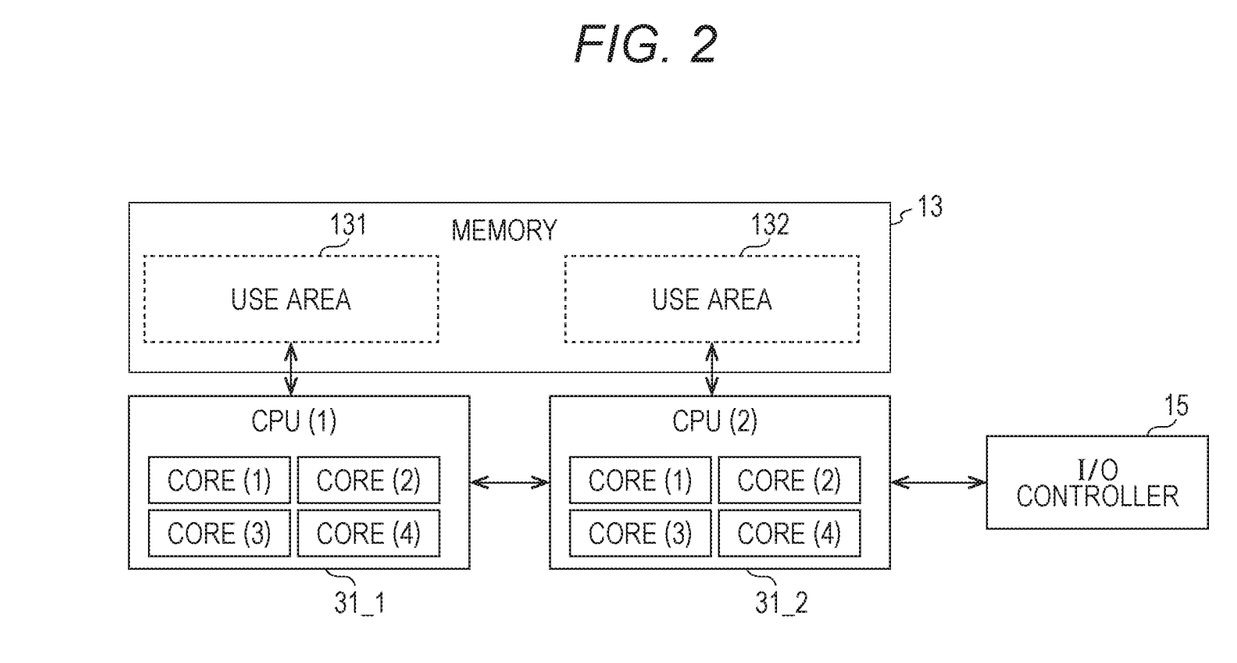
FIG. 2 is a block diagram illustrating an example of a CPU and another CPU in a case where the number of cores is four, according to the embodiment of the present disclosure.

FIG. 2 is a block diagram illustrating an example of a CPU 31_1 and a CPU 31_2 in a case where the number of cores is four, according to the embodiment of the present disclosure. In the example illustrated in FIG. 2, two CPUs 31 are mounted in one processor 11 as the CPU 31_1 and the CPU 31_2 and a plurality of cores is mounted in each CPU 31 as indicated as a core (1), a core (2), a core (3), and a core (4). The CPU 31_1 and the CPU 31_2 access a use area 131 and a use area 132 included in the memory 13 via the memory controller 16, but illustration of the memory controller 16 is omitted in FIG. 2.

Figure 3:
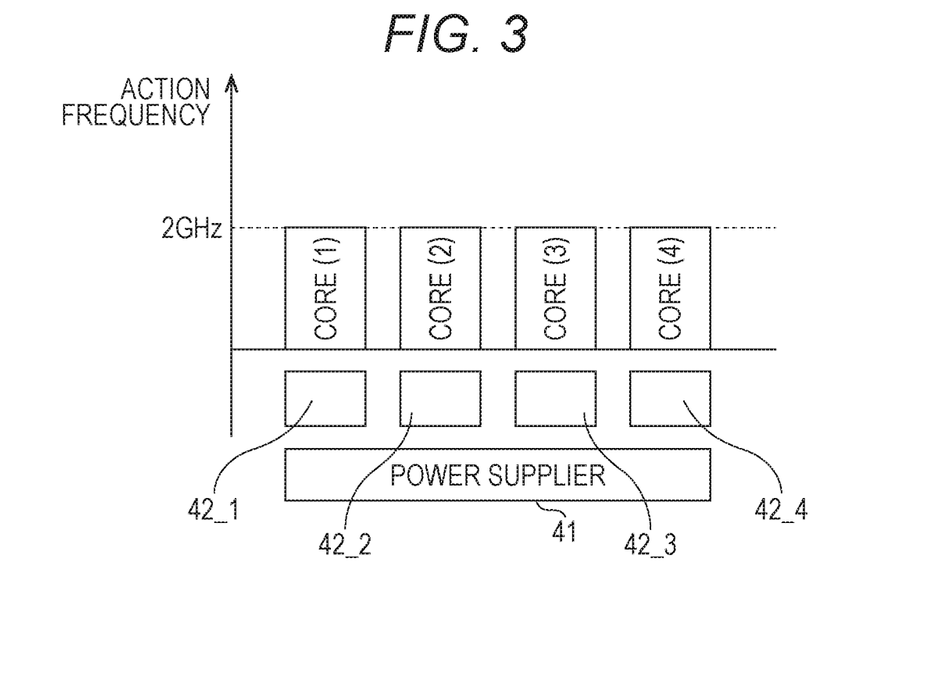
FIG. 3 is a diagram illustrating an example of uniformly supplying electric power to each core, according to the embodiment of the present disclosure.
Figure 4:
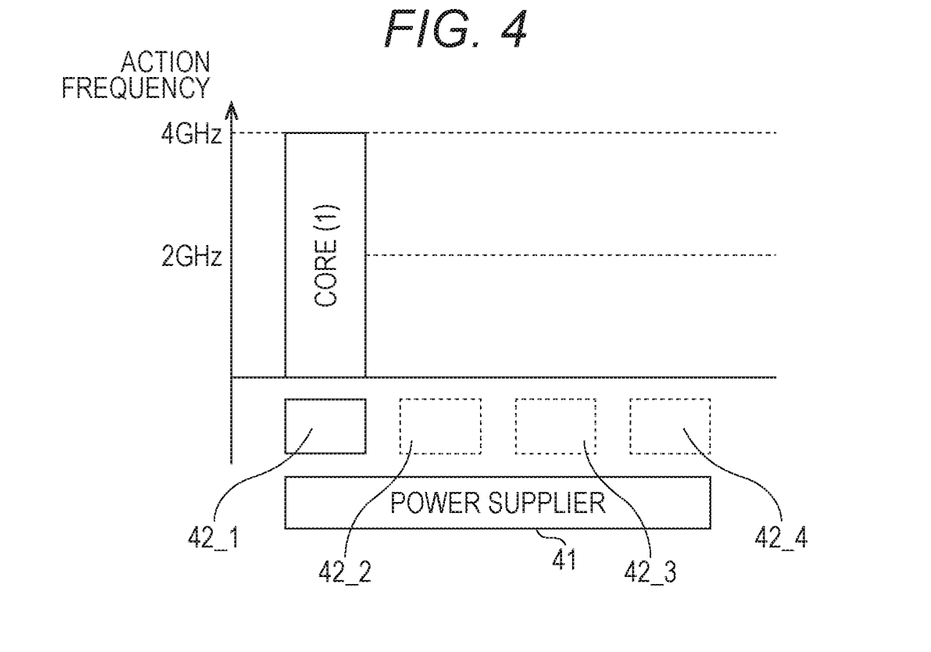
FIG. 4 is a diagram illustrating an example of supplying electric power to a part of cores among multiple cores, while stopping the supply of electric power to another part of cores, according to the embodiment of the present disclosure.

FIG. 3 is a diagram illustrating an example of uniformly supplying electric power to each core, according to the embodiment of the present disclosure. As illustrated in FIG. 3, electric power is supplied from a power supplier 41 to the cores (1) to (4) via switches 42_1 to 42_4. In the example in FIG. 3, each of the cores (1) to (4) is activated at an upper limit action frequency of 2 GHz and none is activated at an upper limit action frequency exceeding 2 GHz. Note that the switches 42_1 to 42_4 are collectively referred to as switches 42. FIG. 4 is a diagram illustrating an example of supplying electric power to a part of cores among multiple cores, while stopping the supply of electric power to another part of cores, according to the embodiment of the present disclosure. As illustrated in FIG. 4, since the switch 42_1 is in an ON state, electric power is supplied from the power supplier 41 to the core (1). On the other hand, since the switches 42_2 to 42_4 are in an OFF state, the supply of electric power from the power supplier 41 to the cores (2) to (4) is stopped. In this case, only the core (1) is activated at an upper limit action frequency of 4 GHz. In other words, in response to stopping the supply of electric power to the cores (2) to (4), the upper limit action frequency of the core (1) alone is raised.

Figure 5:
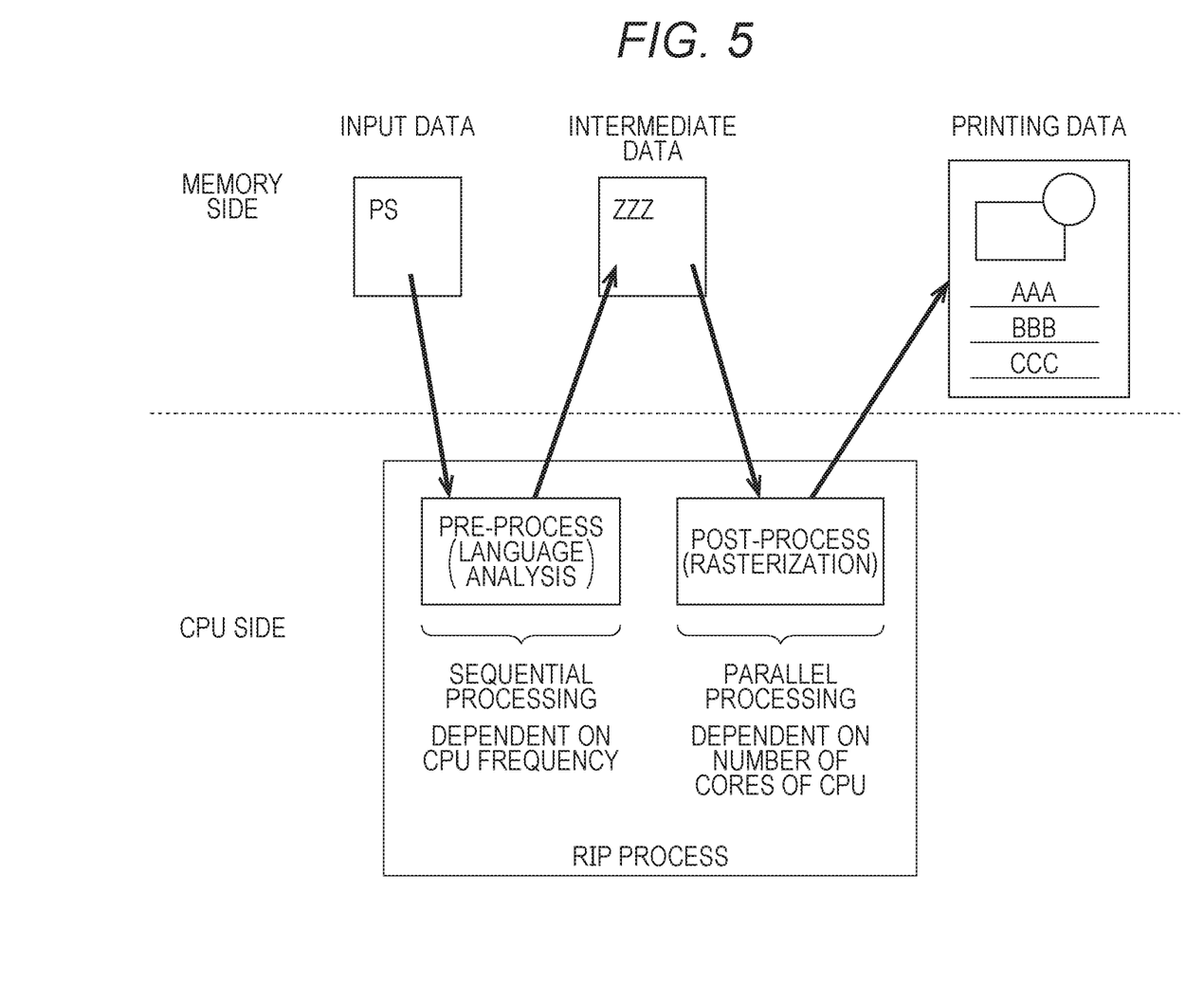
FIG. 5 is a diagram for explaining an outline of a RIP process according to the embodiment of the present disclosure.
Figure 6:
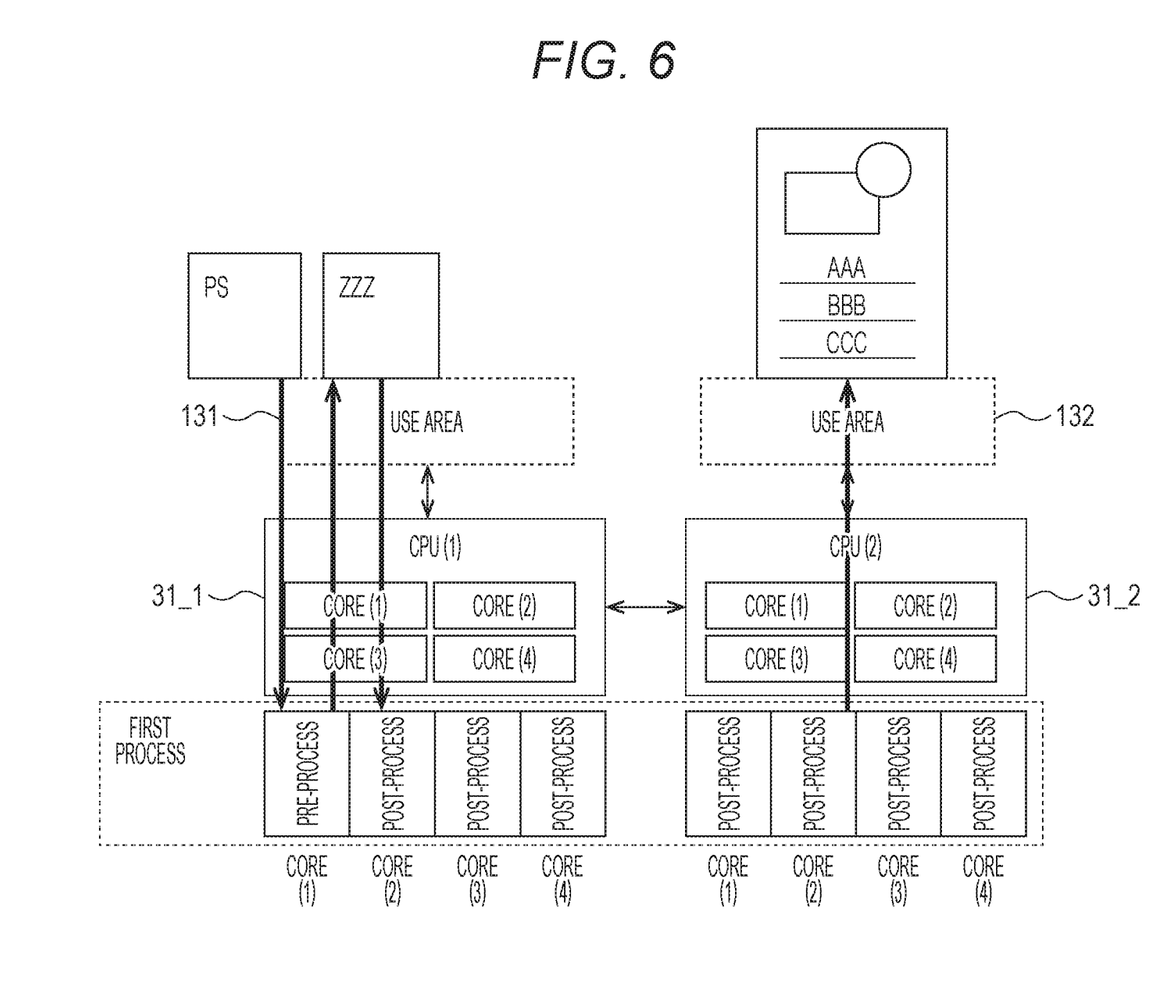
FIG. 6 is a diagram illustrating an example of load apportionment to cores in a first process using all cores, according to the embodiment of the present disclosure.
Figure 7:
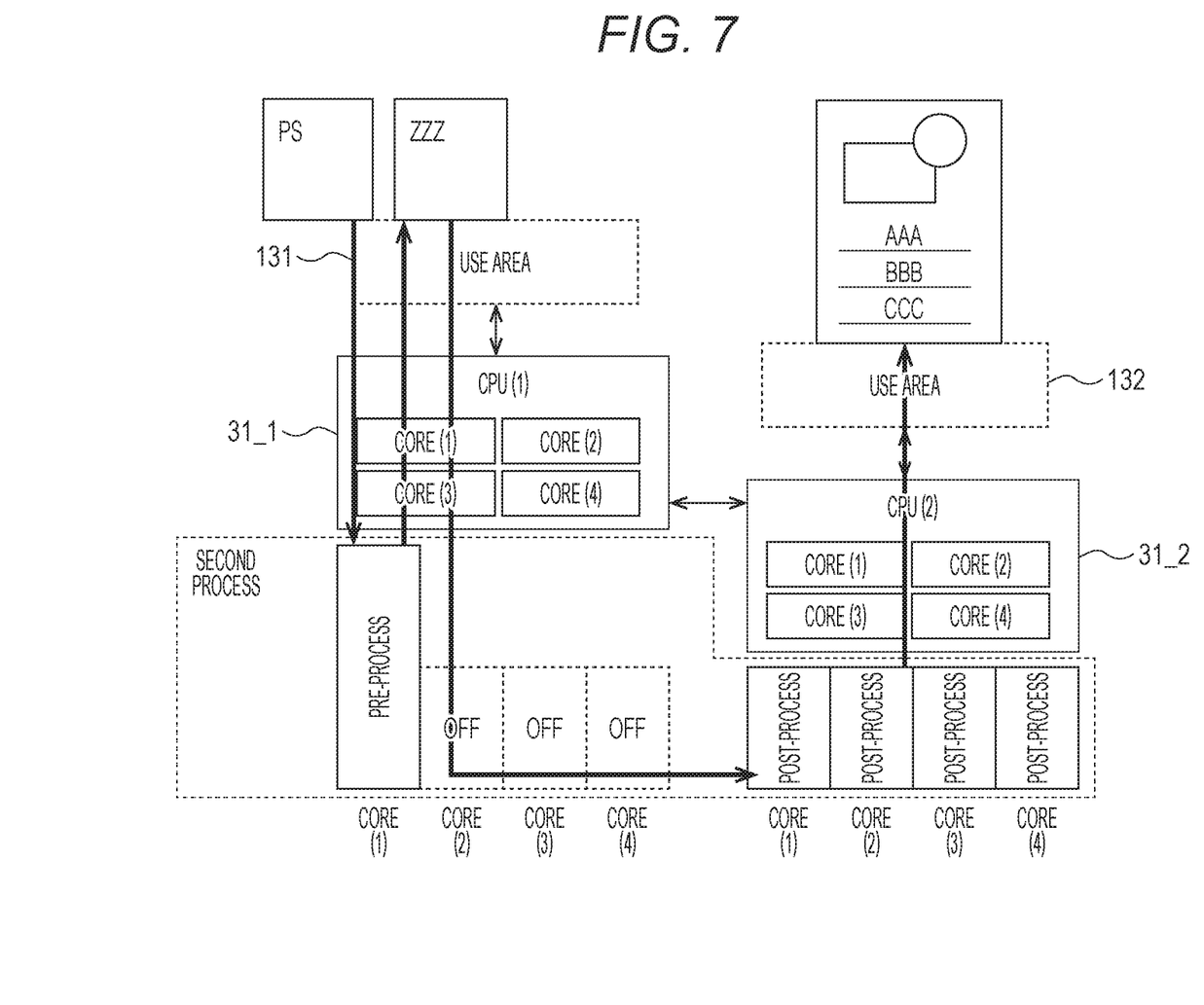
FIG. 7 is a diagram illustrating an example of load apportionment to cores in a second process in which an upper limit action frequency of a specific core is raised, according to the embodiment of the present disclosure.

FIG. 5 is a diagram for explaining an outline of a RIP process according to the embodiment of the present disclosure. The RIP process is separated into a pre-process for performing language analysis and a post-process for performing a rasterizing process. Since the language analysis is sequential processing, parallel processing cannot be performed and the execution time depends on the action frequency. Since parallel processing can be performed for rasterization and use of a plurality of cores can further shorten the execution time, the execution time depends on the number of cores to which the process is allocated. The respective loads of language analysis and rasterization are not constant but depend on documents. Therefore, there are cases where the load of language analysis is heavy and cases where the load of rasterization is heavy. FIG. 6 is a diagram illustrating an example of load apportionment to cores in a first process using all cores, according to the embodiment of the present disclosure. In the first process, all the cores are allocated. Specifically, the core (1) of the CPU 31_1 is allocated to language analysis and all the remaining cores are allocated to rasterization. FIG. 7 is a diagram illustrating an example of load apportionment to cores in a second process in which the upper limit action frequency of a specific core is raised, according to the embodiment of the present disclosure. The second process allocates the load to cores so as to raise the upper limit action frequency only for a specific core in order to speed up the process of language analysis. In FIGS. 6 and 7, the pre-process is language analysis, which analyzes input data in a page description language format to generate intermediate data in an intermediate language format. In the post-process, image processes including the rasterizing process is performed on the intermediate data in the intermediate language format generated by the pre-process to generate print data in a bitmap format and page assignment is performed on the generated print data in the bitmap format to generate printing data therefrom.

In other words, the CPU core manager 17 causes either one of the first process or the second process to be executed. When the first process is executed, while causing electric power to be uniformly supplied to the plurality of cores included in each of the CPUs 31, the CPU core manager 17 allocates the pre-process in which sequential processing is performed to a part of cores among the plurality of cores and allocates the post-process in which parallel processing can be performed to another part of cores. When the second process is executed, for a part of the CPUs 31 among the plurality of CPUs 31, the CPU core manager 17 allocates the pre-process to a part of cores among the plurality of cores while causing electric power to be supplied thereto and causes the supply of electric power to another part of cores to be stopped. For another part of the CPUs 31, the CPU core manager 17 allocates the post-process to at least a part of the plurality of cores while causing electric power to be uniformly supplied to the plurality of cores.

Figure 8:
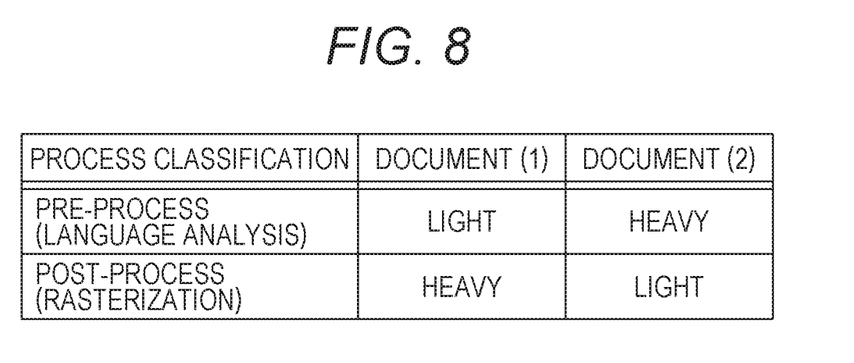
FIG. 8 is a diagram illustrating an example of a load that varies between a pre-process and a post-process depending on documents, according to the embodiment of the present disclosure.
Figure 9:
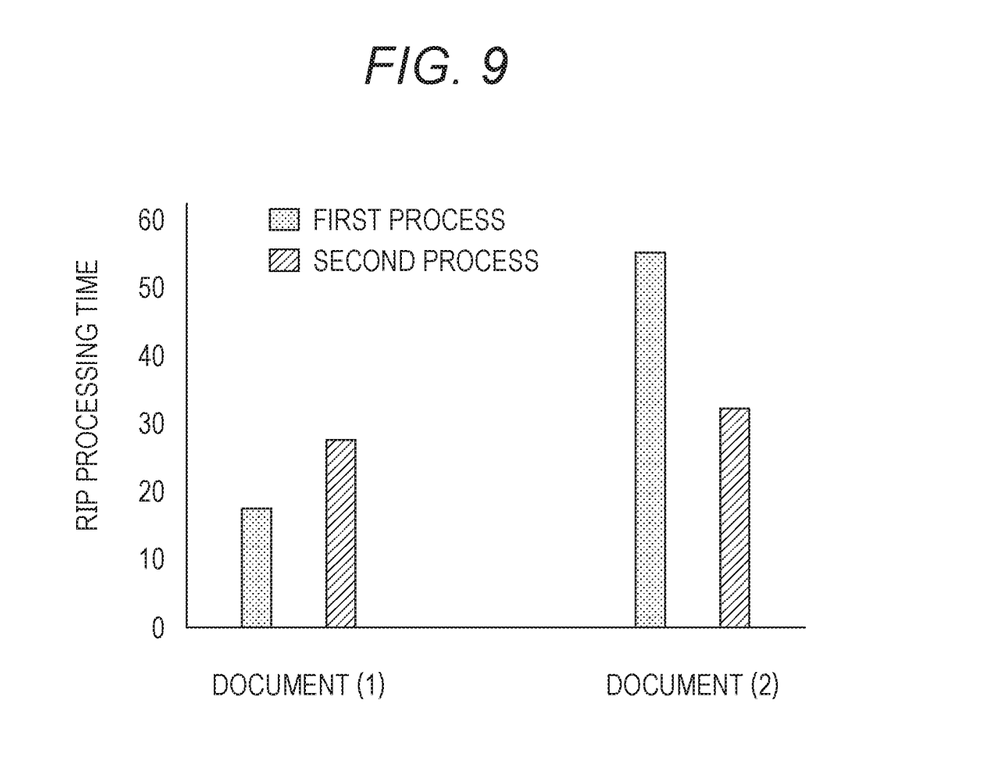
FIG. 9 is a diagram illustrating an example of execution times required for each of the first process and the second process depending on documents, according to the embodiment of the present disclosure.

FIG. 8 is a diagram illustrating an example of a load that varies between the pre-process and the post-process depending on documents, according to the embodiment of the present disclosure. A document (1) has a light pre-process load and a heavy post-process load. For example, what is drawn in a raster format is assumed as such a document. A document (2) has a heavy pre-process load and a light post-process load. For example, what is drawn in a vector format is assumed as such a document. FIG. 9 is a diagram illustrating an example of execution times required for each of the first process and the second process depending on documents, according to the embodiment of the present disclosure. Since it is assumed that the document (1) is drawn in a raster format, language analysis which is a pre-process takes less time and accordingly, the execution time for the RIP process is made shorter with the first process in which more cores can be allocated to the post-process. On the other hand, since it is assumed that the document (2) is drawn in a vector format, language analysis which is a pre-process takes time. Therefore, the execution time of the RIP process is made shorter with the second process in which the upper limit action frequency for the pre-process is raised. Consequently, by optimizing the load allocated to the cores of the CPU 31 in view of the contents of the RIP process, the execution time of the RIP process can be shortened.

Figure 10:
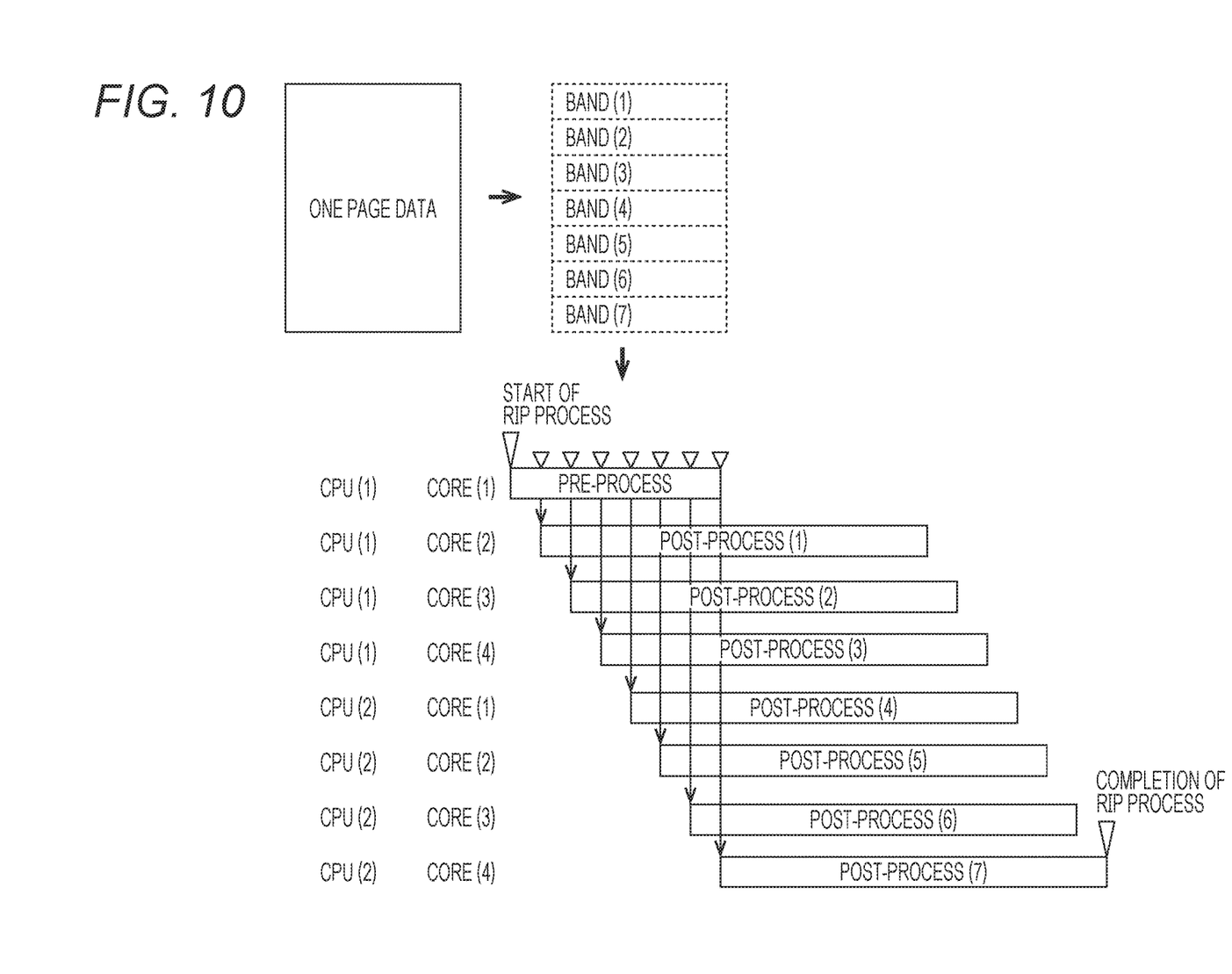
FIG. 10 is a diagram illustrating an example of the execution time required for the first process for a document of which the load of language analysis, which is a pre-process, is light and the load of rasterization, which is a post-process, is heavy, according to the embodiment of the present disclosure.
Figure 11:
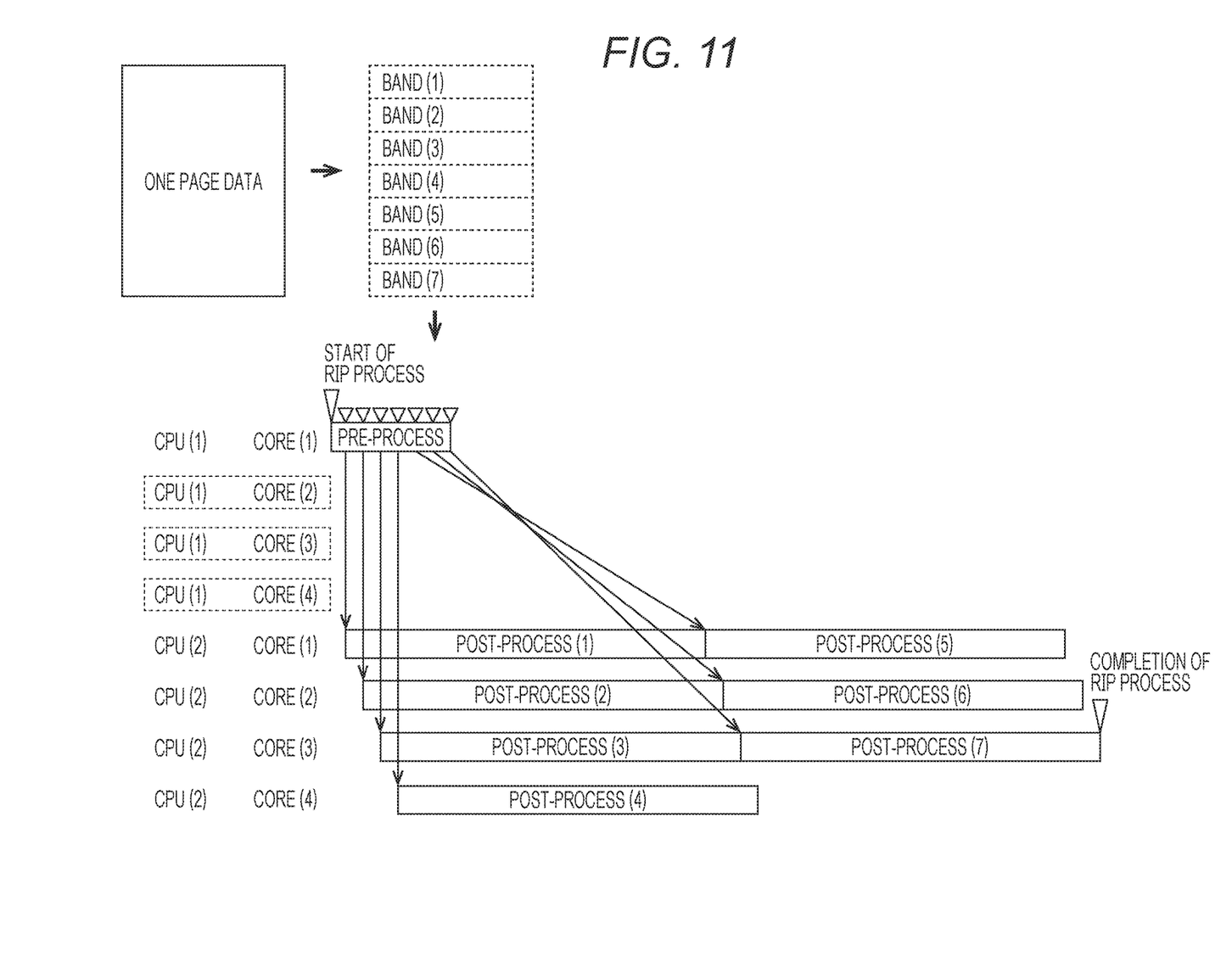
FIG. 11 is a diagram illustrating an example of the execution time required for the second process for a document of which the load of language analysis, which is a pre-process, is light and the load of rasterization, which is a post-process, is heavy, according to the embodiment of the present disclosure.
Figure 12:
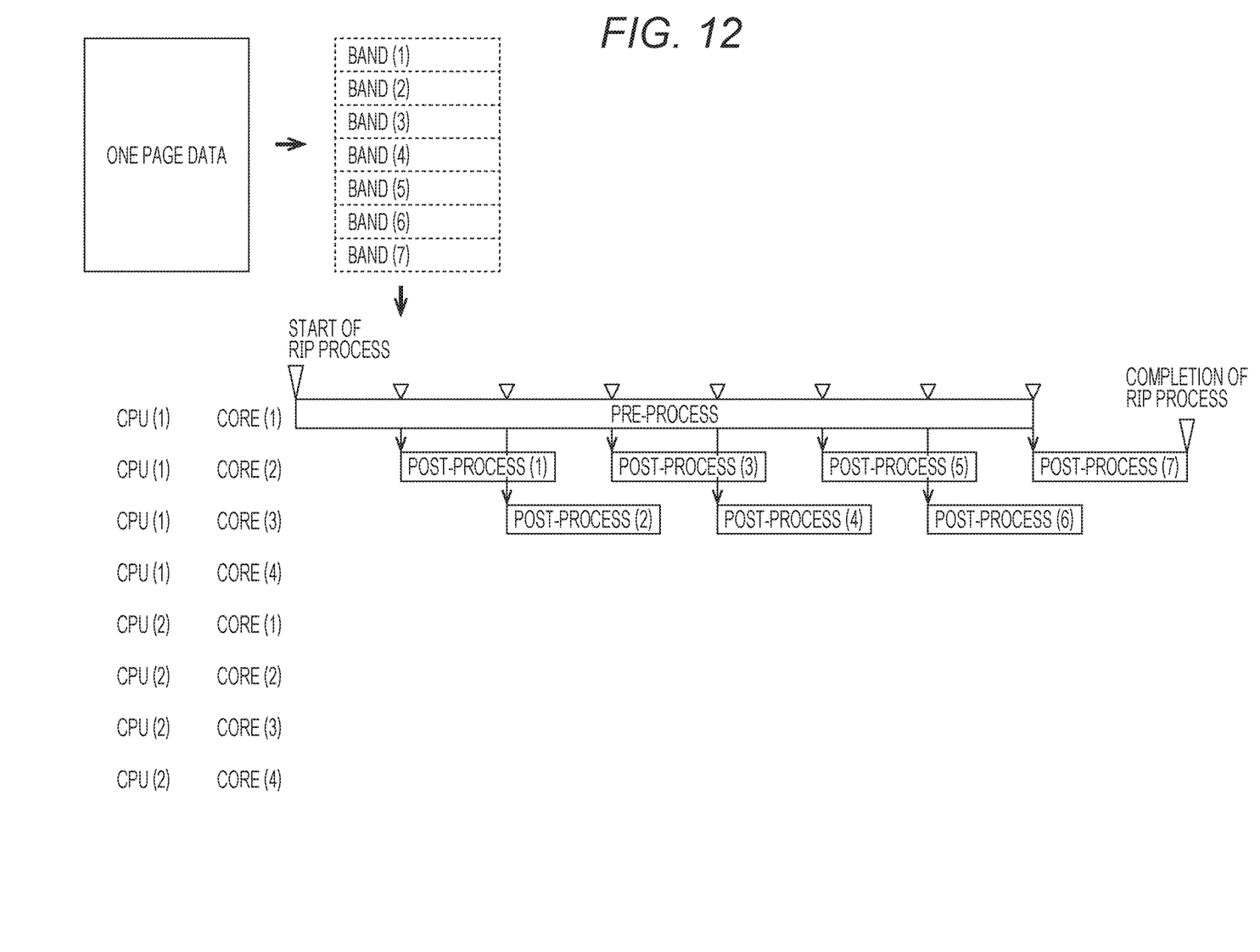
FIG. 12 is a diagram illustrating an example of the execution time required for the first process for a document of which the load of language analysis, which is a pre-process, is heavy and the load of rasterization, which is a post-process, is light, according to the embodiment of the present disclosure.
Figure 13:
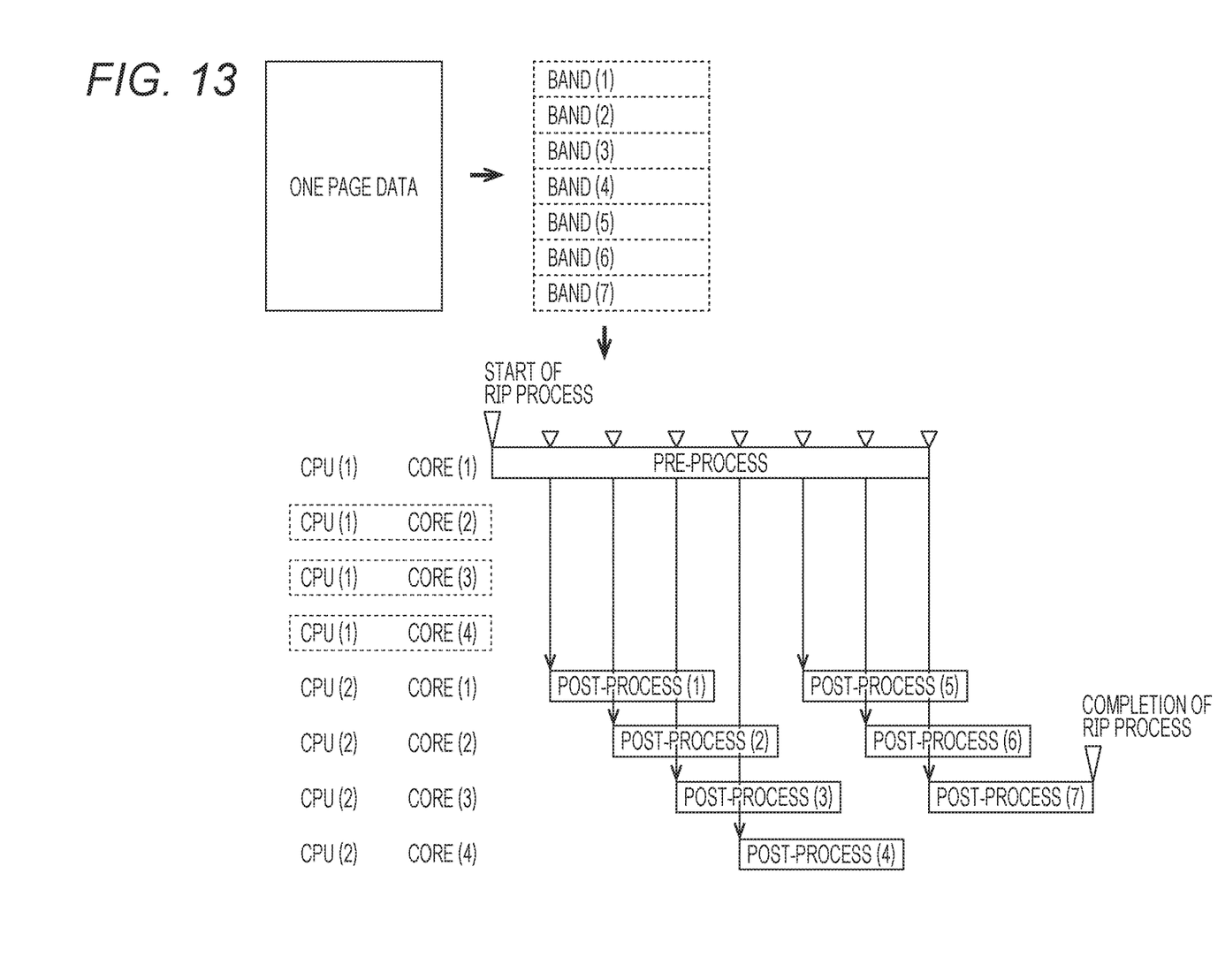
FIG. 13 is a diagram illustrating an example of the execution time required for the second process for a document of which the load of language analysis, which is a pre-process, is heavy and the load of rasterization, which is a post-process, is light, according to the embodiment of the present disclosure.

Next, the allocation of the load to each core will be specifically described. As a prerequisite for the process, input data is broken up into pages and one page is further split up into a plurality of bands to be handled on a band basis and then the pre-process and the post-process are executed. FIG. 10 is a diagram illustrating an example of the execution time required for the first process for a document of which the load of language analysis, which is a pre-process, is light and the load of rasterization, which is a post-process, is heavy, according to the embodiment of the present disclosure. In FIG. 10, a plurality of cores is allocated to the post-process. FIG. 11 is a diagram illustrating an example of the execution time required for the second process for a document of which the load of language analysis, which is a pre-process, is light and the load of rasterization, which is a post-process, is heavy, according to the embodiment of the present disclosure. In FIG. 11, although the upper limit action frequency of the core (1) is raised, it does not contribute to shortening the execution time of the RIP process as a whole because the load of the pre-process is light. FIG. 12 is a diagram illustrating an example of the execution time required for the first process for a document of which the load of language analysis, which is a pre-process, is heavy and the load of rasterization, which is a post-process, is light, according to the embodiment of the present disclosure. In FIG. 12, although the load is allocated to all the cores, it does not contribute to shortening the execution time of the RIP process as a whole because the load of the language analysis, which is a pre-process, is heavy. FIG. 13 is a diagram illustrating an example of the execution time required for the second process for a document of which the load of language analysis, Which is a pre-process, is heavy and the load of rasterization, which is a post-process, is light, according to the embodiment of the present disclosure. In FIG. 13, the upper limit action frequency of the core (1) is raised. This contributes to shortening the execution time of the pre-process because the load of pre-process is heavy and as a result, the post-process can be started earlier. Therefore, it contributes to shortening the execution time of the RIP process as a whole.

In other words, the CPU core manager 17 increases the number of cores to which the load is allocated if parallelism is inherent in the process and, if the parallelism is not inherent in the process or the process has a large amount of sequential processing, causes the supply of electric power to at least a part of the cores to be stopped so as to raise the upper limit action frequency. With this configuration, the hardware resource can be optimally allocated according to the logical characteristics of the input data, such that the overall processing time can be shortened.

In addition, the CPU core manager 17 causes either one of the first process or the second process to be executed based on the file type or attribute. In the first process, the file type or attribute is the raster format. When the raster format is utilized in drawing, color and density information is recorded for each pixel and accordingly, the load of computation is light but rasterization requires a substantial load. Therefore, the first process that allocates the load to all the cores is preferable. In the second process, the file type or attribute is the vector format. When the vector format is utilized in drawing, an image is stored by mathematical expressions and accordingly, computation, that is, language analysis likely to require a substantial load. Therefore, the second process in which the upper limit action frequency liar the pre-process is raised is preferable. For example, since data is often saved in the vector format in illustrator (registered trademark) of Adobe (registered trademark) Systems Co., Ltd., its extension ai serves as one of determination criteria. In addition, for example, the standard extension bmp represents that the raster format is utilized. Furthermore, since even a PDF file sometimes saves the extension or application of the original file in its property, this property may be consulted.

Figure 14:
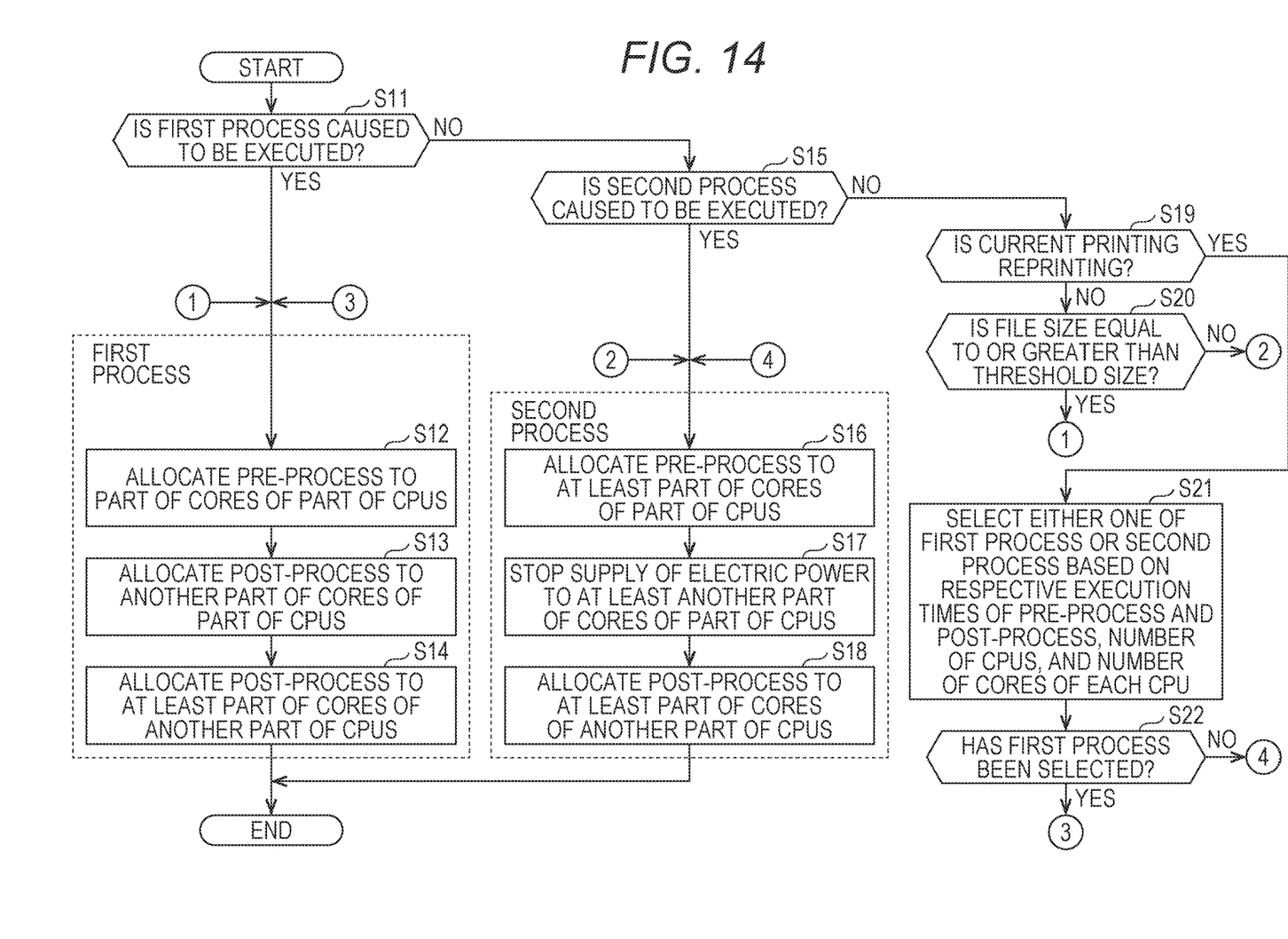
FIG. 14 is a flowchart for explaining a control example according to the embodiment of the present disclosure.

FIG. 14 is a flowchart for explaining a control example according to the embodiment of the present disclosure. Note that processes from step S12 to step S14 correspond to the first process. Meanwhile, processes from step S16 to step S18 correspond to the second process. In step S11, the CPU core manager 17 determines whether to cause the first process to be executed. When determining to cause the first process to be executed (step S11; Y), the CPU core manager 17 shifts to a process in step S12. When determining not to cause the first process to be executed (step S11; N), the CPU core manager 17 shifts to a process in step S15. In step S12, the CPU core manager 17 allocates the pre-process to a part of the cores of a part of the CPUs 31. In step S13, the CPU core manager 17 allocates the post-process to another part of the cores of the part of the CPUs 31. In step S14, the CPU core manager 17 allocates the post-process to at least a part of the cores of another part of the CPUs 31 and the process is terminated.

In step S15, the CPU core manager 17 determines whether to cause the second process to be executed. When determining to cause the second process to be executed (step S15; Y), the CPU core manager 17 shifts to a process in step S16. When determining not to cause the second process to be executed (step S15; N), the CPU core manager 17 shifts to a process in step S19. In step S16, the CPU core manager 17 allocates the pre-process to at least a part of the cores of a part of the CPUs 31. In step S17, the CPU core manager 17 stops the supply of electric power to at least another part of the cores of the part of the CPUs 31. In step S18, the CPU core manager 17 allocates the post-process to at least a part of the cores of another part of the CPUs 31 and the process is terminated.

In step S19, the CPU core manager 17 determines whether the current printing is reprinting. When determining that the current printing is not reprinting (step S19; N), the CPU core manager 17 shifts to a process in step S20. When determining that the current printing is reprinting (step S19; Y), the CPU core manager 17 shifts to a process in step S21. In step S20, the CPU core manager 17 determines whether the file size is equal to or greater than a threshold size. When determining that the file size is equal to or greater than the threshold size (step S20; Y), the CPU core manager 17 shifts to the process in step S12. When determining that the file size is less than the threshold size (step S20; N), the CPU core manager 17 shifts to the process in step S16. For example, when a file contains a raster format image, the file size tends to be large. Specifically, when the file size is 10 Mbytes or more, preferably 50 Mbytes or more, there is a high possibility that a raster format image is inserted in the document and accordingly, it is assumed that rasterization will have a substantial load, Therefore, in this case, it is preferable to select the first process that allocates the load to all the cores.

In other words, the CPU core manager 17 is adapted to cause either one of the first process or the second process to be executed based on the file size. The first process is executed when the file size is equal to or greater than the threshold size. The second process is executed when the file size is less than the threshold size. With this configuration, the execution time of the RIP process can be shortened as a whole.

In step S21, the CPU core manager 17 selects either one of the first process or the second process based on the respective execution times of the pre-process and the post-process, the number of CPUs 31, and the number of cores of each CPU 31. In step S22, the CPU core manager 17 determines whether the first process has been selected. When determining that the first process has been selected (step S22; Y), the CPU core manager 17 shifts to the process in step S12. When determining that the first process has not been selected (step S22; N), the CPU core manager 17 shifts to the process in step S16.

In other words, in the case of reprinting, the CPU core manager 17 causes either one of the first process or the second process to be executed based on the respective execution times of the pre-process and the post-process, the number of CPUs 31, and the number of cores included in each of the CPUs 31. For example, a first RIP process is executed in either one of the first process or the second process and, when the printing data as a result of the RIP process is saved, the respective execution times of the pre-process and the post-process are saved together. With such a procedure, it is possible to determine which process has the shortest execution time from the saved execution times, the number of mounted CPUs 31, and the number of cores of each CPU 31 at the time of reprinting, that is, at the time of a RIP re-process. Consequently, a process to shorten the execution time can be selected considering the load allocated to the resource, whereby the allocation of the load to the resource can be optimized.

In addition, the CPU core manager 17 causes either one of the first process or the second process to be executed on the second and subsequent pages based on the respective execution times of the pre-process and post-process for the first page. In other words, by determining the processing tendency as to which one of the pre-process and the post-process is heavier on the first page, it is possible to achieve the optimum load allocation to the resource on and after the second page.

Furthermore, the CPU core manager 17 selects one of the first process and the second process with a shorter execution time, using a part of the CPUs 31. With this configuration, a part of the resource can be used for an execution time determination process.

Additionally, the CPU core manager 17 designates the time required from the start of the pre-process to the completion of the last item of the post-process as the execution time of each of the first process and the second process. In other words, since one of the processes is selected depending on the execution time required for the RIP process, it is possible to select a process capable of shortening the time of the RIP process.

In addition, the CPU core manager 17 causes a part of the CPUs 31 to count the execution time of each of the first process and the second process. With this configuration, a part of the resource can be used for an execution time counting process.

Furthermore, while each of the CPUs 31 is executing either one of the pre-process or the post-process, the CPU core manager 17 causes a part of the plurality of cores to count the execution time of each of the first process and the second process. Therefore, since the time counting process can be executed concurrently with the execution of either one of the pre-process or the post-process, the productivity can be enhanced as a whole.

Note that each process described above may be executed on a per-process basis in terms of software, but it is preferable that the process be executed on a thread basis.

Although the image forming apparatus 1 according to the present disclosure has been described and illustrated based on the embodiments, the disclosed embodiments are made for purposes of illustration and example only and not limitation, and modifications may be made without departing from the spirit of the present disclosure. The scope of the present invention should be interpreted by terms of the appended claims.

For example, the present embodiment has described an example of the memory 13 having the centralized shared memory architecture but is not particularly restricted thereto. For example, the memory 13 may have the distributed shared memory architecture.

In addition, the present embodiment has described an example of the first process and the second process that are the RIP process but is not particularly restricted thereto. For example, the first process and the second process may be an image process performed on the FAX image data described above. Alternatively, the first process and the second process may be an image process for displaying on the operation display 25. Alternatively, the first process and the second process may be a process that converts a hypertext markup language (HTML) file into a format used to output to a monitor of a computer device (not illustrated), or the like. In other words, the first process and the second process can be any process as long as the output of the process is associated with images.

Furthermore, the present embodiment has described an example in which the supply of electric power to the cores (2) to (4) is stopped when the second process is executed but is not particularly restricted thereto. For example, the supply of electric power to the cores (2) and (3) may be stopped.

What is claimed is:

1. An image forming apparatus comprising a hardware processor including a plurality of central processing units (CPUs) each including a plurality of cores, a process being executed by the CPUs, wherein
    the hardware processor that manages the plurality of cores
    causes either one of a first process or a second process to be executed,
    when causing the first process to be executed, while causing electric power to be uniformly supplied to the plurality of cores included in each of the CPUs, allocates a pre-process in which sequential processing is performed to a part of cores among the plurality of cores and allocates a post-process in which parallel processing is performed to another part of cores, and
    when causing the second process to be executed, among the plurality of CPUs,
    for a part of the CPUs, allocates the pre-process to a part of cores among the plurality of cores while causing electric power to be supplied to the part of cores and causes supply of electric power to another part of cores to be stopped, and
    for another part of the CPUs, allocates the post-process to at least a part of the plurality of cores while causing electric power to be uniformly supplied to the plurality of cores.

2. The image forming apparatus according to claim 1, wherein
    the pre-process
    is language analysis and analyzes input data in a page description language format to generate intermediate data in an intermediate language format, and
    the post-process
    performs an image process including a rasterizing process on the intermediate data in the intermediate language format generated by the pre-process to generate print data in a bitmap format and performs page assignment on the generated print data in the bitmap format to generate printing data from the generated print data.

3. The image forming apparatus according to claim 1, wherein
    the hardware processor
    causes either one of the first process or the second process to be executed based on a file type or attribute, in the first process,
    the file type or attribute is a raster format, and
    in the second process,
    the file type or attribute is a vector format.

4. The image forming apparatus according to claim 1, wherein
    the hardware processor
    causes either one of the first process or the second process to be executed based on a file size,
    the first process
    is executed when the tile size is equal to or greater than a threshold size, and
    the second process
    is executed when the file size less than the threshold size.

5. The image forming apparatus according to claim 1, wherein
    the hardware processor,
    in the case of reprinting, causes either one of the first process or the second process to be executed based on respective execution times of the pre-process and the post-process, the number of CPUs, and the number of cores included in each of the CPUs.

6. The image forming apparatus according to claim 1, wherein
the hardware processor
causes either one of the first process or the second process to be executed on second and subsequent pages based on respective execution times of the pre-process and post-process for a first page.

7. The image forming apparatus according to claim 1, wherein
the hardware processor
selects one of the first process and the second process with a shorter execution time, using a part of the CPUs.

8. The image forming apparatus according to claim 7, wherein
the hardware processor
designates a time required from start of the pre-process to completion of a last item of the post-process as an execution time of each of the first process and the second process.

9. The image forming apparatus according to claim 7, wherein
the hardware processor
causes a part of the CPUs to count an execution time of each of the first process and the second process.

10. The image forming apparatus according to claim 7, wherein
the hardware processor causes,
while each of the CPUs is executing either one of the pre-process or the post-process, a part of the plurality of cores to count an execution time of each of the first process and the second process.

11. A non-transitory recording medium storing a computer readable program activated in any core among a plurality of cores in an apparatus comprising a hardware processor including a plurality of CPUs each including the plurality of cores,
the program causing either one of a first process or a second process to be executed,
the program causing the apparatus to perform:
when executing the first process, while causing electric power to be uniformly supplied to the plurality of cores included in each of the CPUs, allocating a pre-process in which sequential processing is performed to a part of cores among the plurality of cores and allocating a post-process in which parallel processing is performed to another part of cores;
when executing the second process, among the plurality of CPUs,
for a part of the CPUs, allocating the pre-process to a part of cores among the plurality of cores while causing electric power to be supplied to the part of cores, and causing supply of electric power to another part of cores to be stopped; and
for another part of the CPUs, allocating the post-process to at least a part of the plurality of cores while causing electric power to be uniformly supplied to the plurality of cores.

* * * * *